United States Patent Office 3,492,281
Patented Jan. 27, 1970

3,492,281
PROCESS FOR THE POLYMERIZATION OF DIOLE-
FINS WITH β TITANIUM TRICHLORIDE AND
ORGANOALUMINUM COMPOUNDS
Geoffrey H. Smith, Stow, and William M. Saltman, Akron,
Ohio, assignors to The Goodyear Tire & Rubber Company, Akron, Ohio, a corporation of Ohio
No Drawing. Filed June 29, 1967, Ser. No. 649,814
Int. Cl. C08d 1/14
U.S. Cl. 260—94.3    10 Claims

ABSTRACT OF THE DISCLOSURE

A process for the polymerization of diolefins to form a high yield of high molecular weight polymer of substantially regular structure by contacting the diolefin with a catalyst system, the principal ingredient of which is beta titanium trichloride prepared by reacting titanium tetrachloride with a compound prepared from the reaction of aluminum, aluminum chloride, titanium tetrachloride and an aromatic hydrocarbon in the presence of a ligand which will complex aluminum chloride, the minor ingredient of the catalyst system being an organoaluminum compound.

---

This invention relates to the polymerization of diolefins to high yields of regularly oriented polymers. More particularly, it relates to the use of a novel catalyst system for the polymerization of diolefins to high yields of regularly oriented polymers. More specifically it relates to the polymerization of diolefins by means of a catalyst containing beta titanium trichloride which is prepared by reacting titanium tetrachloride with a compound prepared from the reaction of aluminum, aluminum chloride, titanium tetrachloride and an aromatic hydrocarbon in the presence of a ligand which will complex aluminum chloride.

The polymerization of diolefins to form stereoregular oriented polymers is well-known. For example, high cis 1,4 polyisoprene has been heretofore prepared by contacting isoprene usually in an inert diluent with a catalyst system comprising a mixture of aluminum trialkyl compounds and titanium tetrachloride. When the same catalyst is employed to polymerize butadiene, a regularly oriented polymer of high 1,4 content containing both cis and trans configuration is obtained.

These prior methods require, however, the use of a relatively large amount of an expensive and hazardous aluminum trialkyl compound. Aluminum trialkyl compounds are both expensive and pyrophoric. The process described in this invention is one which utilizes extremely small amounts of this expensive and hazardous material.

Further, these prior catalysts contain a reduced and impure $TiCl_3$ prepared by the reaction of relatively large quantities of aluminum alkyls and titanium tetrachloride. Depending on the mole ratio of the aluminum/titanium (Al/Ti), the catalyst produced is also contaminated with aluminum chloride or organo titanium complexes both of which have been found to be undesirable.

The present invention employs beta titanium trichloride as the principal component. This beta titanium trichloride is prepared by a unique and novel method requiring no alkyl aluminum compounds in its preparation and subsequently requiring only a small amount of an organoaluminum compound to activate it for use in polymerizing diolefins.

It is, therefore, an object of this invention to provide a method whereby high yields of regularly oriented polymers can be obtained from diolefins. Another object is to polymerize diolefins to regularly oriented polymers by a method employing a novel catalyst system. Still another object is to provide a method whereby no undesirable side reactions take place during the polymerization. Still another object is to provide a method whereby inexpensive materials are used in the preparation and activation of a $TiCl_3$ catalyst. Still another object is to provide a diolefin polymerization system requiring relatively small amounts of organoaluminum compounds. Still another object is to provide a catalyst system free of undesirable impurities. Other objects will become apparent as the description proceeds.

According to the present invention diolefins are polymerized to high yields of high molecular weight polymers of substantially regular orientation by a method which comprises contacting at least one diolefin, under polymerization conditions, with a catalyst system comprising a mixture of (1) at least one organoaluminum compound and (2) beta titanium trichloride, said beta titanium trichloride prepared by reacting titanium tetrachloride with a compound formed by the reaction of aluminum, aluminum chloride, titanium tetrachloride and an arene in the presence of a ligand which will complex aluminum chloride, said organoaluminum compound being employed in an amount sufficient to activate the said beta titanium trichloride.

The diolefins which are polymerized in accordance with this invention contain from 4 to about 8 carbon atoms and two carbon to carbon double bonds. These double bonds are usually conjugated but non-conjugated diolefins can also be polymerized. Representative examples of such diolefins are 1,3-butadiene, isoprene, 2-ethyl butadiene-1,3, 1,3; 1,4 and 1,5-hexadiene, 1,3 and 1,4-pentadiene, 1,3; 1,4 and 1,5-octadiene, 2-propyl-1,3-butadiene and 2-butyl-1,3-butadiene. Other branched chain diolefins containing from 4 to about 8 carbon atoms may also be employed. These diolefins may also be polymerized in mixture with each other or in mixture with another olefin copolymerizable therewith to form copolymers all of which is known to those skilled in the art.

The active beta titanium trichloride catalyst component of this invention is prepared by reacting titanium tetrachloride with a compound formed by the reaction of aluminum, aluminum chloride, titanium tetrachloride and an arene when the reaction is conducted in the presence of a ligand which can complex with aluminum chloride. It is an advantage of this reaction that the ligand employed forms a complex with aluminum chloride which complex remains soluble in the arene solvent in which the reaction is conducted. At the same time, the active beta titanium trichloride catalyst component is precipitated in essentially an aluminum-free form.

It is known that a reaction of a mixture of aluminum, aluminum chloride, titanium tetrachloride and an arene employing a fairly wide range of molecular ratios of the reactants produces a crystalline solid which has the empirical formula:

This reaction using benzene ($C_6H_6$) as the arene can be represented by the following equation:

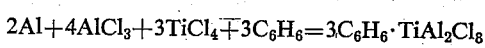

It is also known that the further reaction of this product with additional titanium tetrachloride results in the formation of a brown solid containing beta titanium trichloride. However, it appears that this brown solid is beta titanium trichloride complexed with or co-crystallized with aluminum chloride. In some manner the beta $TiCl_3$ and $AlCl_3$ are bound together, so that the two salts cannot be separated. This second reaction of the compound of aluminum, aluminum chloride, titanium tetrachloride and an arene with additional titanium tetrachloride (again using benzene as the arene) is believed to be represented in symbolical form as follows:

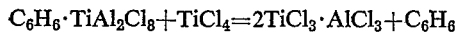

$$C_6H_6 \cdot TiAl_2Cl_8 + TiCl_4 = 2TiCl_3 \cdot AlCl_3 + C_6H_6$$

It has been found that neither of these compounds, arene·TiAl$_2$Cl$_8$ nor TiCl$_3$·AlCl$_3$ is suitable as a catalyst to polymerize diolefins to polymers which contain any substantial amount of stereoregularity.

In the formation of the intermediate compound, arene·TiAl$_2$Cl$_8$, (which is subsequently reacted in the presence of a ligand with additional titanium tetrachloride) the ratio of the reactants to each other may be varied over a wide range. It is preferable to use an excess of the aluminum metal, usually in powder form, and a somewhat lesser excess of aluminum chloride relative to the titanium tetrachloride used. The arene, likewise, is used in excess as it also acts as a solvent for the reacting constituents. Good yields of the arene·TiAl$_2$Cl$_8$ complex have been obtained when the mole ratio of TiCl$_4$/AlCl$_3$/Al range from about 1/1.3/1 to about 1/20/50, with a preferable ratio ranging between about 1/2/2 and about 1/6/20. It has been found that good results are obtained at a ratio of about 1/2/6.

The preparation of the arene·TiAl$_2$Cl$_8$ may be carried out over a wide range of temperatures. A convenient method of preparing the complex is to carry it out under reflux conditions at the boiling temperature of the arene, e.g., when benzene is used about 78° C. An inert gas should be employed to blanket the reactants. When using benzene as both the complexing arene and the reaction solvent, a temperature about 75° C. to 80° C. has been found satisfactory. By such a technique the complex is formed in good yield in about 1 to 8 hours, depending upon the particular reaction conditions.

Suitable arenes which may also be employed as solvents in the formation of the complex are selected from a class of benzene, alkylated benzenes, such as toluene, xylenes, mesitylene, ethyl benzene; halogenated benzenes as chlorobenzene; also naphthalene, tetralin, cumene and cyclohexylbenzene may be employed. It is usually preferable to use benzene as both the arene involved in the reaction and as a solvent.

The ligands which are employed in this invention are ligands which, under the reaction conditions employed, will complex with aluminum chloride to form a soluble complex in the arene solvent used as a medium in which the reaction is conducted. Representative of such ligands are ethers, examples of which are aliphatic ethers represented by diethyl, ethyl methyl, dipropyl ethers, diaryl ethers represented by diphenyl, ditolyl, dixylyl, phenyltolyl, dibiphenyl, mixed aliphatic-aromatic ethers such as methylphenyl (anisole), ethylphenyl and the like; thioethers represented by phenylmethyl, diphenyl sulfides, and the like; amides represented by dimethylformamide, acetamide, dimethyl acetamide, propionamide; ketones represented by benzophenone, acetophenone, butyrone and the like; phenol and alkylated phenols represented by p-cresol, o-ethylphenyl and other alkylated phenols; sulfur compounds, examples of which are diphenylsulfate, diethylsulfate, dimethylsulfoxide, diethylsulfoxide, dibutylsulfoxide, dioctylsulfone, dimethylbenzene sulfonamide, dimethylsulfone and the like; carboxylic esters, representative of which are propyl adipate, ethyl benzoate, ethyl malonate, butyl succinate, butyl naphthoate and the like; organic phosphorous compounds, examples of which are hexaoctyl phosphoric triamide, triethyl phosphate, tricresyl phosphate, triphenyl phosphite, triethylphosphite and the like.

The preferred ligands which are employed in the process of this invention are ethers. These ethers are compounds corresponding to the formula ROR' wherein R and R' are selected from the group consisting of alkyl, cycloalkyl, aryl, alkaryl and aralkyl. Representative examples of such ethers are dimethyl ether, diethyl ether, diisopropyl ether, dibutyl ether, diphenyl ether, phenetole, benzyl ethyl ether, anisole, methyl ethyl ether, ethyl cyclohexyl ether, benzyl ether and tolyl ether. However, any ligand which will remove aluminum chloride and does not destroy the other reagents can be employed.

It is usually not necessary to separate or crystallize the complex arene·TiAl$_2$Cl$_8$ from the arene solvent before proceeding to the preparation of the β titanium trichloride. Usually at the end of the complex formation reaction, the agitation is stopped and the unreacted excess aluminum and AlCl$_3$ settle out. The arene solution of the complex can then be decanted off or separated in some convenient manner.

In the formation of the β titanium trichloride the reaction between arene·TiAl$_2$Cl$_8$ and titanium tetrachloride can take place either in a one-step or a two-step reaction. If a one-step reaction is desired, the proper ratios of titanium tetrachloride and the ligand are simultaneously added to the solution of arene·TiAl$_2$Cl$_8$ at which time the β titanium trichloride precipitates, thus facilitating its removal from the other reaction products. An alternative one-step process is to add the arene·TiAl$_2$Cl$_8$ to a mixture of the ligand and TiCl$_4$ in the arene, again precipitating the active form of β TiCl$_3$. If a two-step process is desired, the ligand is added to the arene·TiAl$_2$Cl$_8$ complex in arene solution first and subsequently the titanium tetrachloride is added, or TiCl$_4$ is dissolved in the arene followed by the complex, followed by the ligand. In other words, no specific order of addition is required so long as all the reactants are present. The β titanium trichloride precipitates and may be readily separated from the other reaction products and the solvent.

While the exact mechanism of the preparation of β TiCl$_3$ by the method of this invention is not known, it is known that at least two moles of the complexing ligand are theoretically required per mole of arene·TiAl$_2$Cl$_8$ complex to completely remove the aluminum chloride when the complex decomposes during the reaction with additional TiCl$_4$. This is not to say, however, that less than 2 moles of ligand per mole of complex cannot be employed but that when less than 2 moles of ligand per mole of complex are employed, all of the AlCl$_3$ may not be removed. Thus, the mole ratio of ligand to complex may vary quite broadly, but it is preferred to use at least a 4/1 mole ratio of ligand to complex to insure complete separation of aluminum compounds from the precipitated β TiCl$_3$.

While there is no limit to the amount of additional titanium tetrachloride added to precipitate β titanium trichloride, it is economical to add only enough to recover a major amount of β TiCl$_3$. Since titanium tetrachloride is a liquid, and is soluble in hydrocarbon solvents such as benzene, pentane and the like, any excess which is included to precipitate the β titanium trichloride may be readily washed out. However, on the other hand, a large excess of titanium tetrachloride relative to the complex would be uneconomical. Therefore, theoretically the optimum should be one mole of titanium tetrachloride per mole of the complex arene·TiAl$_2$Cl$_8$. It has been found as a practical matter that it is preferable to use a small excess of TiCl$_4$, e.g., a mole ratio of about 1.1/1 to about 1.5/1, TiCl$_4$/arene·TiAl$_2$Cl$_8$ complex followed by a thorough washing of the β TiCl$_3$ to remove traces of excess TiCl$_4$.

In the preparation of β TiCl$_3$ of this invention, it is usually desirable to employ air- and moisture-free techniques, as both the β titanium trichloride and the starting materials, TiCl$_4$ and arene·TiAl$_2$Cl$_8$, are susceptible to degradation by both air and moisture.

The temperature at which the final step of the preparation of the β TiCl$_3$ is carried out is not critical and may vary over a relatively wide range. It is known, however, that at temperatures above about 80° C. the product β TiCl$_3$, begins to transform to a different structural form; thus, for best results an upper limit of about 80° C. should not be exceeded unless it is desired to prepare the other (gamma) form of TiCl$_3$. On the other hand, it has been discovered that the lower the temperature at which the formation of β TiCl₃ is prepared, the more catalytically active it appears to be. It would appear, then, that the lower practicable limit at which the reaction may be carried out is controlled by the freezing point of the particular arene solvent employed. It has been observed that when the preferred ligands, diphenyl ether or anisole, and the preferred arene, benzene, are employed, about 10° C. is a very effective temperature at which to operate.

The other component of the catalyst system of this invention is one or more organoaluminum compounds. The organoaluminum compounds of this invention may be selected from several general types. One type of organoaluminum compound suitable in this invention is a trisubstituted aluminum compound and may be symbolized by the formula

wherein $R_1$ is selected from the group consisting of alkyl (including cycloalkyl), aryl, aralkyl, alkaryl, and halogen radicals and hydrogen; $R_2$ and $R_3$ are selected from the group consisting of alkyl (including cycloalkyl), aryl, aralkyl and alkaryl radicals. $R_1$, $R_2$ and $R_3$ may be the same or different radicals. Mixtures of such organoaluminum compounds may also be employed in this invention.

Another type of organoaluminum compounds are organoaluminum etherates and can be symbolized by the formula

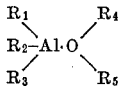

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$ and $R_5$ are selected from the group consisting of aliphatic, alicyclic and aromatic radicals; O is oxygen and Al is aluminum. $R_1$, $R_2$, $R_3$, $R_4$ and $R_5$ may be the same or different radicals. Mixtures of such compounds may also be employed.

Another type of organoaluminum compound are organoaluminum aminates of the formula

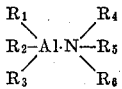

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$, $R_5$ and $R_6$ are selected from the group consisting of aliphatic, alicyclic and aromatic radicals; N is nitrogen and Al is aluminum. $R_1$, $R_2$, $R_3$, $R_4$, $R_5$ and $R_6$ may be the same or different radicals. Mixtures of these compounds may also be employed.

Another type of organoaluminum compound are organoaluminum thioetherates and can be symbolized by the formula

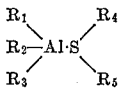

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$ and $R_5$ are selected from the group consisting of aliphatic, alicyclic and aromatic radicals; Al is aluminum and S is sulfur. Mixtures of such compounds may also be employed.

Representative of and by no means limiting of such trisubstituted organoaluminum compounds are: dimethyl aluminum chloride, diethyl aluminum chloride, di-n-propyl aluminum chloride, di-n-butyl aluminum chloride, diisobutyl aluminum chloride, dihexyl aluminum chloride, dioctyl aluminum chloride, diphenyl aluminum chloride, dioctyl aluminum bromide, di-n-propyl aluminum bromide, di-n-butyl aluminum bromide, diisobutyl aluminum bromide, diethyl aluminum iodide, di-n-propyl aluminum iodide, di-n-butyl aluminum iodide, diisobutyl alumnum iodide and other organoaluminum halides. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolylethyl aluminum hydride, p-tolyl-n-propyl aluminum hydride, p-tolylisopropyl aluminum hydride, benzylethyl aluminum hydride, benzyl-n-propyl aluminum hydride, benzylisopropyl aluminum hydride and other organoaluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyldiphenyl aluminum, ethyldi-p-tolyl aluminum, ethyldibenzyl aluminum, diethylphenyl aluminum, diethyl-p-tolyl aluminum, diethylbenzyl aluminum and other triorgano aluminum compounds.

The organoaluminum etherates of this invention may be formed from the trisubstituted organoaluminum compounds by reacting the organoaluminum compounds with equal molar quantities of ether. The same organoaluminum compounds set forth previously are employed to form the organoaluminum etherates. The ether is employed to form the organoaluminum etherates and may be defined by the general formula $$R_4—O—R_5$$

wherein $R_4$ and $R_5$ are selected from the group consisting of aliphatic, alicyclic and aromatic radicals. These radicals may contain additional ethereal oxygen atoms. Also, $R_4$ and $R_5$ may be joined to form a cyclic structure.

Representative of the ether portion of the organoaluminum etherates of this invention are methyl, ethyl, propyl, isopropyl, butyl, isobutyl, secondary butyl, tertiary butyl, amyl, isoamyl, tertiary amyl, hexyl, cyclohexyl, heptyl, methyl ethyl, ethyl neopentyl, propyl cyclohexyl, octyl secondary butyl, ethyl propyl ethers; ethylene oxides, 1,2-propylene oxide, 1,3-propylene oxide, tetrahydrofuran, tetrahydropyran, dimethoxyethane, diethoxyethane, dimethoxymethane, m- and p-dioxanes, alpha naphthyl ether, diphenyl ether, dibiphenyl ether, anisole, phenetole, beta naphthyl ether, phenyl benzyl ether and the like.

Any of the ethers mentioned above can be reacted with equal mole quantities of any of the organoaluminum compounds previously mentioned to form the organoaluminum etherates useful in this invention. The organoaluminum etherates can be prepared by other known methods also intended to be included within the scope of this invention. Representative of the organoaluminum etherates useful in this invention are: phenyl ethyl aluminum hydride diethyl etherate, p-tolyl ethyl aluminum hydride diethyl etherate, benzyl ethyl aluminum hydride diethyl etherate, triethyl aluminum diethyl etherate, triisobutyl aluminum diethyl etherate, triphenyl aluminum di-n-propyl etherate, tri-p-tolyl aluminum dibutyl etherate, tribenzyl aluminum diisopropyl etherate, triethyl aluminum methyl ethyl etherate, triisobutyl aluminum ethyl propyl etherate, triisobutyl aluminum diphenyl etherate, triethyl aluminum phenyl benzyl etherate, triethyl aluminum anisolate, diethyl aluminum chloride diethyl etherate, tri-n-propyl aluminum diphenyl etherate, diethyl aluminum chloride tetrahydrofuranate, tri-n-propyl aluminum anisolate, diethyl aluminum chloride anisolate, diethyl aluminum chloride diphenyl etherate, diethyl aluminum bromide dibenzyl etherate and diethyl aluminum iodide ethyl propyl etherate.

The organoaluminum thioetherates of this invention may be formed from the trisubstituted organoaluminum compounds by reacting the organoaluminum compounds with equal molar quantities of thioether. The same organoaluminum compounds set forth previously are employed to form the organoaluminum thioetherates. The thioether is employed to form the organoaluminum thioetherates and may be defined by the general formula $$R_4—S—R_5$$

wherein $R_4$ and $R_5$ are selected from the group consisting of aliphatic, alicyclic and aromatic radicals.

Representative of the thioether portion of the organoaluminum thioetherates of this invention are methyl, ethyl, propyl, isopropyl, butyl, isobutyl, secondary and tertiary butyl, amyl, isoamyl, tertiary amyl, hexyl, cyclohexyl, heptyl, cycloheptyl, phenyl, biphenyl, naphthyl thioethers. Also mixed aromatic aliphatic thioethers are included such as: methylphenyl sulfide, ethylphenyl sulfide, propylphenyl sulfide, butylphenyl sulfide, isobutylphenyl sulfide, secondary butyl phenyl sulfide, tertiary butyl phenyl sulfide, amyl phenyl sulfide, isoamyl phenyl sulfide, tertiary amyl phenyl sulfide, hexyl phenyl sulfide, cyclohexylphenyl sulfide, heptyl phenyl sulfide, methyl naphthyl sulfide, ethyl naphthyl sulfide, propyl naphthyl sulfide, butyl naphthyl sulfide, isobutyl naphthyl sulfide, secondary butyl naphthyl sulfide, tertiary butyl naphthyl sulfide, amyl naphthyl sulfide, tertiary amyl naphthyl sulfide, hexyl naphthyl sulfide, cyclohexyl naphthyl sulfide, heptyl naphthyl sulfide and the like.

Substituted aromatic sulfides or aromatic thioethers may also be employed so long as the substituents do not react with or interfere in any manner to destroy, weaken or affect the catalyst activity.

The organoaluminum aromatic thioetherates which are one component of the catalysts of this invention may be prepared by other conventional procedures. The organoaluminum aromatic thioetherates may be prepared by directly reacting an aluminum magnesium alloy with an alkyl bromide in the presence of a particular thioether. These proedures are straightforward and well-known. Other methods of preparing these organoaluminum thioetherates may also be employed. One convenient method is to mix approximately equal molar quantities of the desired thioether with the desired organoaluminum compound. When prepared in this manner the compounds are usually in an inert hydrocarbon solvent (a term more fully described below) for ease of handling and accurate measurement. Therefore, for convenience, the final organoaluminum thioetherate is usually employed as solution in an inert hydrocarbon solvent.

Thus, representative of the organoaluminum thioetherates are those where the thioethers are combined with the organoaluminum compounds in a manner similar to the list of organoaluminum etherates previously listed.

The organoaluminum aminates of this invention may be formed from the trisubstituted organoaluminum compounds by reacting the organoaluminum compounds with equal molar quantities of amine. The same organoaluminum compounds set forth previously are employed to form the organoaluminum aminates. The amine is employed to form the organoaluminum aminates and may be defined by the general formula $$R_4—N—R_6$$
$$\quad\ |$$
$$\quad R_5$$

wherein $R_4$, $R_5$ and $R_6$ are selected from the group consisting of aliphatic, alicyclic and aromatic radicals.

Representative of the main portion of the organoaluminum aminates of this invention are methyl, ethyl, propyl, isopropyl, butyl, isobutyl, secondary and tertiary butyl, amyl, isoamyl, tertiary amyl, hexyl, cyclohexyl, heptyl, cyclohepthyl, phenyl, biphenyl, naphthyl amines. Also, mixed amines such as N,N'-dibutylnaphthylamines, N,N'-diamylnaphthylamine, N - phenyldinaphthylamine, N,N'-methylethylphenylamine, N-naphthyldiphenylamine, N,N'-methylpropylphenylamine, N - methyldiphenylamine, N-ethyldiphenylamine, N-propyldiphenylamine, N,N'-methylethylnaphthylamine, N,N'-methylpropylnaphthylamine, N-cyclohexyldiphenylamine, N,N'-dimethylphenylamine, N-methyldinaphthylamine, N,N'-diethylphenylamine, N-ethyldinaphthylamine, N,N' - dipropylphenylamine, N-propyldinaphthylamine, N,N'-dimethylnaphthylamine, N,N'-diethylnaphthylamine, N-cyclohexyldinaphthylamine, N,N'-dipropylnaphthylamine, and the like.

Substituted aromatic amines may also be employed so long as the substituents do not, themselves, react or interfere in any manner to destroy, weaken or affect catalyst activity.

The organoaluminum aminates of this invention may be prepared by conventional procedures. One convenient method of preparation is to react equal molar or approximately equal molar quantities of the desired organoaluminum compound and the desired amine. These reactions are straightforward and may be conducted with pure compounds or one or both of the reactants may be reacted while dissolved in inert solvents. (A term described in more detail elsewhere in this specification.)

Thus, representative of the organoaluminum aminates are those where the amines are combined with the organoaluminum compounds in a manner similar to the list of organoaluminum etherates previously listed.

The beta $TiCl_3$ formed as described above is an active catalyst in forming good yield of high molecular weight and substantially regularly oriented polymers, especially high 1,4 polymers from diolefins, and requires relatively small amounts of alkyl aluminum compounds to activate it.

When the principal catalyst employed is the beta titanium trichloride prepared from the complex compound as described above, sufficient organoaluminum compound must be employed with the beta titanium trichloride to cause it to polymerize diolefins. There is no lower limit on the amount of organoaluminum compound to add, but sufficient organoaluminum compound must be added to activate the beta titanium trichloride. Any excess organoaluminum compound above the amount required to activate the principal catalyst not only would represent economic waste but would nullify the economic advantages of using the specially prepared beta titanium trichloride catalyst. The ratio of the organoaluminum component to the titanium component can vary rather widely. It has been observed that even a trace amount of the organoaluminum component is sufficient to activate the beta titanium trichloride. Thus, the Al/Ti mole ratio will probably range from 0.001/1 up to about 0.2/1.

The total amount of catalyst employed to polymerize the diolefins, of course, depends on the polymerization conditions, purity of the system and other factors. Although there is no lower or upper limit to the total amount of catalyst used, of course, sufficient catalyst must be employed to cause the polymerization to take place. Good results have been obtained when a catalyst level of 1.32 millimoles of beta $TiCl_3$ per 100 grams of diolefin monomer is employed.

The polymerization process may be performed with the solid catalyst phase (beta $TiCl_3$) as a dispersion in an inert, organic diluent medium. To this the liquid catalyst component the organoaluminum compound is added. Inert organic diluents which can be used are preferably saturated hydrocarbons such as pentanes, hexanes, heptanes, octanes, decanes, mixtures thereof and the like, or cycloparaffins, such as the cyclopentanes, the cyclohexanes, or mixtures thereof with each other or with paraffins, and the like. The benzenoid aromatics such as benzene, toluene, mesitylene, and xylenes can also be used. Any inert diluent may be employed so long as there is no interaction between these diluents and the catalyst system or the product of the polymerization. The same inert solvents or diluents as used to put the catalyst in solution may also be used as the polymerization diluent since the polymerization is most often a solution polymerization.

When a diluent or solvent is employed as the polymerization diluent, the solvent/monomer volume ratios have not been found to be critical and may vary over wide ranges. For example, up to 20 or more to 1 volume ratio of solvent to monomer can be employed. Usually, however, it is preferred to use a solvent/monomer volume ratio of from about 3/1 to about 6/1.

The temperatures employed in the polymerization of this invention may vary broadly between such extremes as —10° C. or lower up to 90° C. or higher and are not considered to be critical. It has usually been the practice, however, to employ a more convenient temperature range of from about 10° C. to about 50° C.

The pressures required in the invention are likewise not critical and may be subatmospheric or superatmospheric. It is usually the practice to use autogeneous pressures.

Moisture-free and air-free techniques are employed in the polymerization of this invention.

The practice of this invention is further illustrated by reference to the following examples which are intended to be illustrative rather than restrictive of this invention. All parts and percentages are reported by weight unless otherwise indicated. The diolefins described in the examples are polymerized with the $\beta TiCl_3$ catalyst prepared according to the procedures outlined above.

EXAMPLE I

Preparation of $C_6H_6 \cdot TiAl_2Cl_8$ complex

A 500-milliliter 3-necked flask was loaded, in a dry box, with 16 grams of anhydrous aluminum chloride ($AlCl_3$) and 10.2 grams of dried aluminum dust. A small Teflon-coated magnetic stirrer bar was placed in the flask, the flask was placed on a magnetic stirrer and connected to a reflux condenser, a nitrogen inlet and a nitrogen outlet filtration apparatus. Pure nitrogen was swept through the flask and 100 milliliters of benzene ($C_6H_6$) was added, the stirrer turned on and 11.5 grams of titanium tetrachloride ($TiCl_4$) was added. The flask was heated by an oil bath set at 120° C. At the end of 20 hours the deep violet solution was cooled to and filtered at 20° C. Then 100 milliliters of heptane was added to the filtrate and the mixture cooled to —10° C. and most of the solid purple precipitate crystallized out. The majority of the mixed solvent was removed by a syringe and the remainder in vacuo at 25° C. A total yield of 81% (based on the $TiCl_4$ charged) was obtained as fine, deep violet crystals. The entire procedure was carried out with the careful exclusion of air and moisture.

EXAMPLE II

Preparation of beta titanium trichloride

To a suitable flask was added 54 grams of benzene and 3.3 grams of the $C_6H_6 \cdot TiAl_2Cl_8$ complex prepared in Example I. To this mixture 3.0 milliliters of anisole was added. Immediately a dark-brown precipitate formed. No evolution of heat was observed. Then 24 milliliters of a 0.3 molar solution of titanium tetrachloride in benzene was added. A very dark-room precipitate formed and the mixture was allowed to stand for 30 minutes. This mixture was then centrifuged and a dark-brown solid and a brown-benzene layer were separated. The benzene layer was removed and the brown solid was washed four times with fresh benzene. The benzene from the washings and from the original layer was hydrolyzed with aqueous sulfuric acid and extracted exhaustedly with the hydrolysis agent. An aluminum analysis of the aqueous extract indicated that 0.41 gram of aluminum had been removed from the reaction mixture. Based on the amount of ingredients employed, the theoretical results accounting for all of the aluminum added should have been 0.40 gram. The amounts of $C_6H_6 \cdot TiAl_2Cl_8$ complex, ether (anisole) and $TiCl_4$ employed in this example, when calculated on a molar relationship to each other, were an ether/arene·$TiAl_2Cl_8$ mole ratio of 3.86/1 and $TiCl_4$/arene·$TiAl_2Cl_8$ mole ratio of 1.1/1.

EXAMPLE III

Polymerization with $\beta TiCl_3$

To a number of 4-ounce bottles were added 10 grams of isoprene and 40 grams of pentane. To each of these bottles was added an amount of the beta titanium trichloride prepared as in Example II to give 0.132 millimole of $\beta TiCl_3$ per ten grams of isoprene. Subsequently, to each bottle was added an amount of triisobutyl aluminum or triisobutyl aluminum diphenyl etherate or triisobutyl aluminum anisole etherate as indicated by the following table. The polymerizations were allowed to proceed at 50° C. for 2½ hours at which time the reaction was terminated by precipitating the polyisoprene formed with alcohol and the percent yield was determined. The results and the particular organoaluminum compound used are given in the following table. The results are in terms of weight percent yield of polyisoprene obtained at varying Al/Ti mole ratios in the catalysts employed.

| Organoaluminum compound | Moles organoaluminum compound added per mole TiCl₃ | | | | |
|---|---|---|---|---|---|
| | 0.10 | 0.15 | 0.20 | 0.30 | 0.50 |
| TIBA | 65 | | 41 | 10 | 4 |
| TIBA.φ₂O | | | 67 | 18 | 7 |
| TNPA | 69 | | 28 | | |
| TNPA.φOCH₃ | 87 | | 66 | 33 | |
| TIBA | 17 | | 86 | 63 | |
| TIBA.φ₂O | 13 | | 86 | 63 | |
| TNPA | | | 89 | 66 | |
| TNPA.φOCH₃ | 79 | | 89 | 53 | |
| TIBA | 84 | 86 | 70 | | |
| TIBA.φ₂O | 78 | 87 | 65 | | |
| TNPA | 80 | 84 | 82 | | |
| TNPA.φOCH₃ | 82 | 89 | 85 | | |

TIBA = Triisobutylaluminum.
TIBA.φ₂O = Triisobutylaluminum diphenyl etherate.
TNPA = Tri-n-propylaluminum.
TNPA.φOCH₃ = Tri-n-propylaluminum anisole etherate.

EXAMPLE V

In order to compare the efficiency of the catalyst of this invention with a prior art catalyst comprising a mixture of titanium tetrachloride and aluminum triisobutyl, several experiments were conducted as follows: To various polymerization vessels containing 10 grams of isoprene and 40 grams of pentane were added 0.132 millimole of beta $TiCl_3$ prepared in the manner of Example II. To each of these monomer mixtures was added sufficient ti-n-propyl aluminum anisole etherate to give an Al/Ti mole ratio of 0.2/1. The controls were run at the same catalyst level, i.e., 0.132 millimole of titanium per 10 grams of isoprene and at an Al/Ti mole ratio of 0.9/1. The results are reported in percent yield at various times in hours.

| | 0.5 hour | 1 hour | 2½ hours | 5 hours |
|---|---|---|---|---|
| β TiCl₃/TNPA | 74 | 84 | 89 | 90 |
| TIBA/TiCl₄ | 77 | 83 | 89 | 89 |

EXAMPLE VI

In this example a series of experiments was conducted in which 10 grams of purified isoprene and 40 grams of purified pentane were place in a reaction vessel. To each of these was added 0.132 millimole of beta $TiCl_3$ which had been perpared in a manner similar to that of Example II, except that diphenyl ether was employed as the complexing ligand rather than anisole. To each of these polymerizations was added sufficient aluminum triisobutyl to give a mole ratio of aluminum/titanium (Al/Ti) as indicated in the table which follows. These polymerizations were conducted at 50° C. for 2½ hours. The results are given in the table below and Run No. 4 is a control which was prepared by polymerizing the same amount of isoprene under the same conditions with the prior art catalyst, aluminum triisobutyl/titanium tetrachloride at a mole ratio of Al/Ti of 0.9/1 and the same catalyst concentration i.e. 0.132 millimole of $TiCl_4$ per 10 grams of isoprene.

| Run No. | Mole ratio of Al to Ti | Percent conversion |
|---|---|---|
| 1 | 0.2/1 | 88 |
| 2 | 0.1/1 | 87 |
| 3 | 0.2/1 | 86 |
| 4 | 0.9/1 | 86 |

While certain representative embodiments and details have been shown for the purpose of illustrating the invention, it will be apparent to those skilled in this art that various changes and modifications may be made therein without departing from the spirit or scope of the invention.

What is claimed is:

1. The method of polymerizing diolefins to form polymers containing cis-1,4 configuration which comprises contracting at least one diolefin, under polymerization conditions, with a catalyst system comprising a mixture of (1) at least one organoaluminum compound and (2) beta titanium trichloride, said beta titanium trichloride being prepared by reacting, under substantially moisture-free and air-free conditions, titanium tetrachloride with a compound formed by the reaction of aluminum, aluminum chloride, titanium tetrachloride and an arene, in the presence of a ligand which will form an arene soluble complex with aluminum chloride, said reaction being conducted at a temperature which does not exceed 80° C., said organoaluminum compound being employed in an amount sufficient to activate said beta titanium tri-chloride.

2. The method according to claim 1 in which the organoaluminum compound is defined by the formula:

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; and Al is aluminum.

3. The method according to claim 1 in which the organoaluminum compound is defined by the formula:

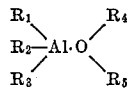

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$ and $R_5$ are selected from the group consisting of aliphatic, alicyclic and aromatic radicals; O is oxygen and Al is aluminum.

4. The method according to claim 1 in which the organoaluminum compound is defined by the formula:

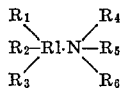

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$, $R_5$ and $R_6$ are selected from the group consisting of aliphatic, alicyclic and aromatic radicals; N is nitrogen and Al is aluminum.

5. The method according to claim 1 in which the organoaluminum compound is defined by the formula:

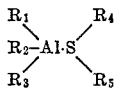

wherein $R_1$ is selected from the group consisting of alkyl (including cycloalkyl), aryl, aralkyl, alkaryl and halogen radicals and hydrogen; $R_2$ and $R_3$ are selected from the group consisting of alkyl (including cycloalkyl), aryl, aralkyl and alkaryl radicals; $R_4$ and $R_5$ are selected from the group consisting of aliphatic, alicyclic and aromatic radicals; Al is aluminum and S is sulfur.

6. The method according to claim 1 in which the ligand employed to prepare the beta titanium trichloride is an ether.

7. The method according to claim 1 in which the diolefin to be polymerized is isoprene.

8. A method according to claim 1 in which the mole ratio of titanium tetrachloride/the compound formed by the reaction of aluminum, aluminum chloride, titanium tetrachloride, and an arene ranges from about 1.1/1 to about 1.5/1 and in which the compound prepared from aluminum, aluminum chloride, titanium tertachloride and an arene is prepared from a mole ratio of $TiCl_4/AlCl_3/$ Al ranging from about 1/1.3/1 to about 1/20/50.

9. The method according to claim 8 in which the arene employed is benzene.

10. The method according to claim 9 in which ether employed as the ligand is selected from the group consisting of diphenyl ether, methyl phenyl ether and diethyl ether, and the diolefin to be polymerized is isoprene.

References Cited

UNITED STATES PATENTS

| 3,388,076 | 6/1968 | Lamborn | 252—429 |
| 3,146,224 | 8/1964 | Coover et al. | 260—93.7 |
| 3,116,274 | 12/1963 | Boehm et al. | 260—94.9 |
| 3,047,559 | 7/1962 | Mayor et al. | 260—94.3 |
| 3,404,141 | 10/1968 | Owen et al. | 260—94.3 |

FOREIGN PATENTS

| 1,004,665 | 9/1965 | Great Britain. |

OTHER REFERENCES

Natta et al.: Gaz. Chem., 89 (1959), pp. 416–417.
Natta: J. Polymer Science, XXXIV (1959), pp. 21–24.
Natta: J. Polymer Science, 51 (1961), pp. 399–403.

JOSEPH L. SCHOFER, Primary Examiner

R. A. GAITHER, Assistant Examiner